United States Patent [19]

Langeoire

[11] Patent Number: 5,044,447

[45] Date of Patent: Sep. 3, 1991

[54] GUIDE AND CONTROL DEVICE FOR AN AGRICULTURAL MACHINE

[76] Inventor: Jacques F. Langeoire, 103, Impasse Clémence de Genéve, Firembieres - 74100 Annemasse, France

[21] Appl. No.: 486,862

[22] Filed: Mar. 1, 1990

[30] Foreign Application Priority Data

Mar. 6, 1989 [FR] France .................. 89 02912

[51] Int. Cl.$^5$ .......................... A01B 73/00
[52] U.S. Cl. ....................... 172/26; 172/285; 172/288; 172/310; 172/385
[58] Field of Search .......... 172/26, 248, 278, 282, 172/284–291, 310, 314, 383–385, 400, 401, 405

[56] References Cited

U.S. PATENT DOCUMENTS

| | | | |
|---|---|---|---|
| 1,042,733 | 10/1912 | Weiler | 172/285 X |
| 1,472,637 | 10/1923 | Dickinson | 172/291 X |
| 1,626,676 | 5/1927 | Hansmann et al. | 172/285 |
| 1,846,652 | 2/1932 | Paul | 172/285 |
| 2,779,261 | 1/1957 | Northcote et al. | 172/427 |
| 2,918,300 | 12/1959 | Hendrickson | 172/383 X |
| 2,982,363 | 5/1961 | Sweet et al. | 172/284 |
| 2,998,853 | 9/1961 | Martensen | 172/383 |
| 3,677,349 | 7/1972 | Gugin | 172/285 |

FOREIGN PATENT DOCUMENTS

| | | | |
|---|---|---|---|
| 258699 | 11/1964 | Australia | 172/383 |
| 1235 | of 1864 | United Kingdom | 172/400 |
| 24052 | of 1897 | United Kingdom | 172/401 |

*Primary Examiner*—Dennis L. Taylor
*Assistant Examiner*—Jeffrey L. Thompson
*Attorney, Agent, or Firm*—Wenderoth, Lind & Ponack

[57] ABSTRACT

A guide and control device for an agricultural machine subjected in operation to a high lateral thrust in relation to its direction of traction, such as a disk-type stubble-plough includes a guide and control system having at the front, a set of freely oscillating twin wheels the orientation of which for a change from a road-travel position to a soil-working position is controlled from a bar for coupling to a tractor. A carrying wheel is arranged in a central part of the frame, and at the rear thereof are arranged freely oscillating twin carrying wheels and furrow wheels controllable simultaneously from their road-travel position to their working position, and vice versa. The multiplicity of carrying wheels guarantees that sufficient grip with the soil is maintained permanently, thus preventing any lateral slip of the machine during passage over a movable obstacle, this also being assisted by the automatic orientation of the twin wheels by means of their freely oscillating mounting.

32 Claims, 6 Drawing Sheets

GUIDE AND CONTROL DEVICE FOR AN AGRICULTURAL MACHINE

BACKGROUND OF THE INVENTION

The subject of the present invention is a guide and control device for an agricultural machine subjected in operation to a lateral thrust in relation to its direction of traction, especially a disk-type stubble-plough.

The machine is of the type comprising a frame equipped with blades, disks or shares, front and rear carrying wheels and with a furrow wheel, and the device comprises a system for controlling the wheels in order to change them from a road-travel position to a working position, and vice versa.

In conventional machines of this type, such as the stubble-ploughs described in French patents 2,536,239 and 2,525,857, front guidance is obtained by means of a single wheel under the control of a compensating bar of a tractor. The wheel, because it is thus subject to the lateral oscillations of a coupling drawbar during work, follows the directional movements determined by the travel of the tractor. Moreover, this wheel moves along on the bottom of the furrow dug by the last disk of the machine during the preceding pass, in a plane inclined in relation to the vertical plane. The purpose of this arrangement is to wedge the wheel in the furrow angle formed by the vertical wall cut out of the soil and the furrow bottom, in order to counteract the lateral thrust exerted by the action of the disks and thereby keep the machine guided in the path of movement of the tractor.

A suitable system makes it possible to keep the inclined wheel in the working position and in the vertical plane in the road-travel position of the machine, so as to prevent the tire of the wheel from wearing and being rolled off the rim, and in order to make the maneuvering of the wheel easier during road transport at a higher speed This known guide device has several major disadvantages.

First of all, the connecting linkage between the front wheel and the compensating traction bar of the machine takes up a considerable amount of space, thus requiring a large steering-lock clearance. The position of the machine is therefore very far to the rear in relation to the tractor. This large bulk of the coupling arrangement gives rise to appreciable losses of cultivated areas in the bends at corners of the fields. Although this defect is of little importance on large areas of extensive cultivation, such as are found particularly in America or Australia, this waste makes the machine virtually useless on the plots of land of smaller area on European farms, where the entire area has to be cultivated, and above all when the machine travels along the edge of fences or hedges.

Another disadvantage of the known machines is that the change from the so-called working position of the wheels to their transport position, and vice versa, is relatively clumsy. In fact, this maneuver requires a lifting force at the front of the machine and an arduous rotation of the wheel shaft, usually by means of a spanner or a lever dangerous to handle or with the aid of a jack in the loose soil of a field. Finally, another disadvantage is the loss of guidance noticed whenever the wheels meet non-fixed obstacles, such as clods of hard earth, stones, wood, or fixed obstacles, such as rocks and roots.

The change of the rear carrying wheels from their road-travel position to their working position, and vice versa, is especially laborious, since the manoeuvre has to be repeated for each wheel and moreover completed by an additional manipulation of the furrow disk associated with one of the wheels.

SUMMARY OF THE INVENTION

The object of the invention is, therefore, to provide a guide and control device in which these disadvantages are eliminated.

According to the invention, the control system for the rear carrying and furrow wheels comprises means for simultaneously controlling the movement of the rear carrying wheels and the movement of the furrow wheels from the road-travel position to the working position, and vice versa.

Several arduous operations for each rear carrying wheel and for the furrow wheel are thus replaced by a single maneuver which can be carried out without any particular force.

According to one embodiment of the invention, this guide device comprises a rigid support mounted pivotally on the rear end of the frame, a first rocker articulated on this support about a substantially horizontal axis and extending on either side of its articulation bearing, and a second rocker articulated on one of the ends of the first rocker about a substantially horizontal axis parallel to the abovementioned horizontal axis, two associated furrow wheels being mounted at the ends of the said second rocker, and the pair of twin wheels being mounted on the end part of the first rocker opposite that carrying the second rocker.

According to other characteristics of the invention, the means for the simultaneous control of the movement of the rear carrying wheels and of the furrow wheels comprise:

a jack articulated on the one hand on the rear part of the frame and on the other hand on the rigid support, so as to be capable of controlling the pivoting of the latter and of the assembly formed by the rockers, the twin carrying wheels and the furrow wheels, and an articulated control connection system between the rigid support and the part of the second rocker carrying the rear furrow wheel, designed so that a pivoting of the rigid support automatically and simultaneously causes a corresponding tilting of the second rocker on its articulation to the first rocker, this tilting lowering the rear furrow wheel towards its working position, if the rigid support pivots in the direction bringing the twin carrying wheels into their working position, and conversely this tilting raising the rear furrow wheel if the rigid support pivots in the direction bringing the twin carrying wheels into their road-travel position.

According to other particular features of the invention, the device possesses a pair of twin front wheels which are mounted freely oscillatingly about a horizontal axis, so as to be capable of changing automatically from the working position to the road-travel position.

Since a similar twin mounting is adopted for two of the rear carrying wheels, the guide device according to the invention thus ensures an automatic and instantaneous angular adjustment of the wheels in relation to the direction of the advance of the machine. This automatic adjustment does away with the need for the involvement of the operator, necessary with the known machines, in order to raise the wheels from their working position to their transport position.

BRIEF DESCRIPTION OF THE DRAWINGS

Other particular features and advantages of the invention will emerge from the following description made with reference to the accompanying drawings which illustrate one embodiment of the invention by way of a non-limiting example.

DETAILED DESCRIPTION OF THE INVENTION

Figure 1:
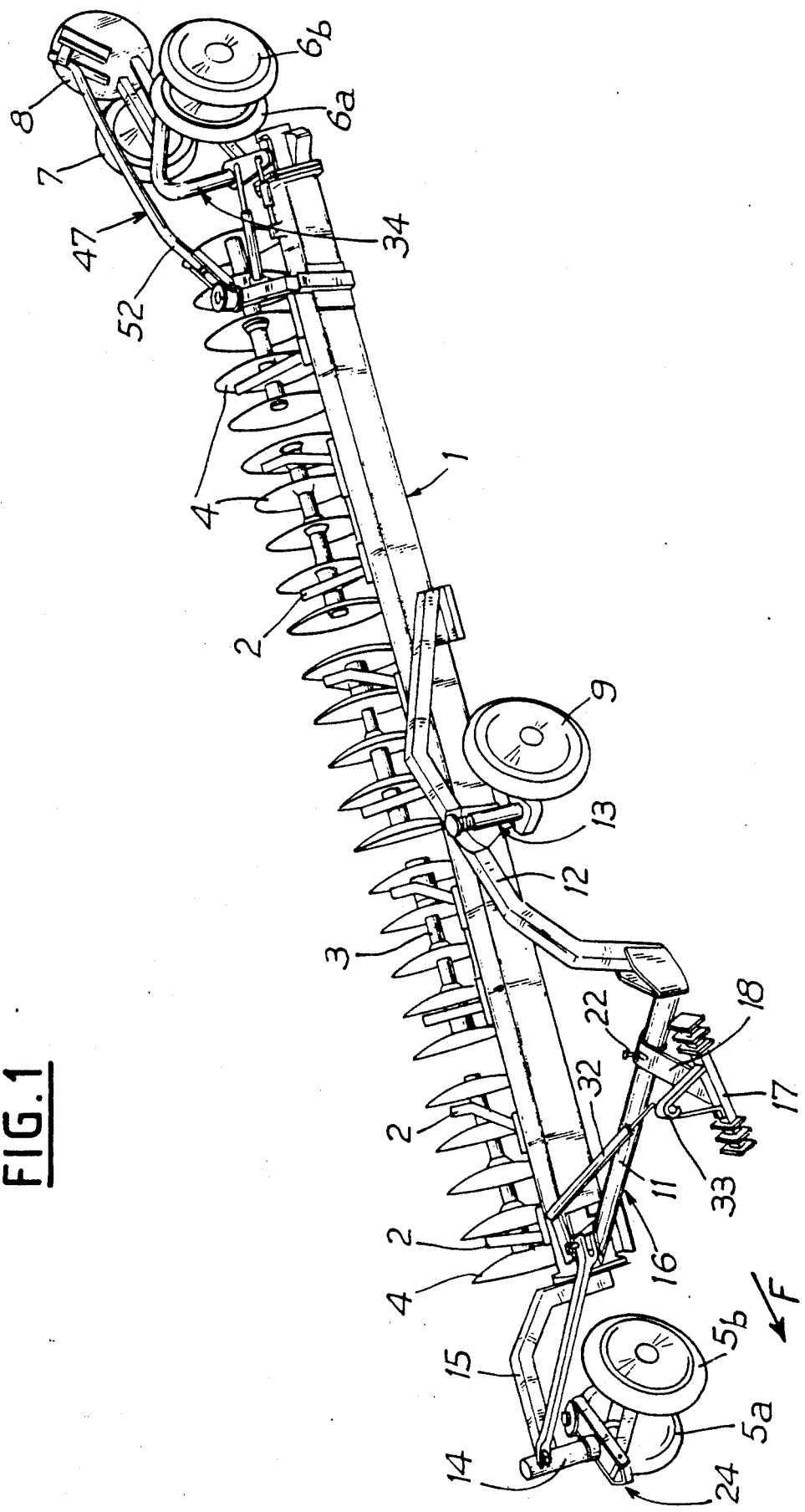
FIG. 1 is a perspective view of an agricultural disk machine equipped with a guide and control device according to the invention.

The agricultural machine illustrated in the drawings is a stubble-plough which comprises a frame 1 formed essentially from a beam and which is equipped on one of its sides with a plurality of oscillating arms 2, each carrying a shaft 3 equipped with a series of concave disks 4 arranged at regular intervals in planes parallel to one another and perpendicular to the beam 1. The shafts 3 can be set in rotation by drive means (not shown) when the disks 4 have penetrated sufficiently far into the soil to plough up its stubble, while the machine is driven by a tractor (not shown) in a direction of advance F inclined at approximately 45° relative to the planes of the disks 4.

The frame 1 is equipped with a plurality of carrying wheels and of furrow wheels, namely a pair of twin wheels 5a, 5b at the front, a pair of twin wheels 6a, 6b at the rear and two furrow wheels 7 and 8, the front and rear wheels being coupled respectively to the front and rear ends of the frame 1. Finally, on the side of the frame 1 opposite the disks 4, a carrying wheel 9 is located in the central zone of the machine.

The machine has an arm 11, one end of which is fastened to the front end of the frame 1 and which is inclined relative to the latter, for example at 45°, in extending a substantially horizontal plane. The other end of the arm 11 is connected to the frame 1 by means of a spar 12 of suitable profile, for example in the form of an upturned C with wide-open branches, and which supports the central wheel 9 mounted to freely pivot about an axle 13 carried by the spar 12. The latter, the arm 11 and that part of the frame 1 located between the spar 12 and the arm 11 thus delimit a triangular structure.

The twin front wheels 5a, 5b are mounted pivotally about a vertical axle 14 carried by the end of a bracket 15 fastened to the front end of the frame 1 by any suitable means, such as bolts. The supporting axle 14 of the wheels 5a, 5b is connected by means of a control linkage 16 to a bar 17 for coupling the machine to a tractor, this coupling bar 17 being articulated in its central zone on a piece 18, through which passes the arm 11 about which it can tilt. The position of the piece 18 and consequently of the coupling bar 17 on the arm 11 can be adjusted by means of a series of holes 21 (FIG. 5) which are made at regular intervals in the arm 11 and in one of which a locking pin 22 passing through the piece 18 can be inserted.

The front wheels 5a, 5b are mounted at the ends of a non-straight shaft 23 (FIG. 6) formed from two broken-line parts 23a, 23b which between them delimit in the two horizontal and vertical planes such an angle that the wheels 5a, 5b have appropriate toe-in and toe-out angles between them. The shaft 23 is articulated in a bearing formed at the lower end of a yoke 24a supporting the axle 14. The articulation of the broken shaft 23 in the lower end of the yoke 24a oscillates freely about a substantially horizontal axis ZZ (FIG. 6), about which the wheels 5a, 5b can therefore tilt freely between angular deflection limits. These limits are formed by stops 25a, 25b (FIGS. 5 and 6) made on the sides of the yoke 24a above the two corresponding parts 23a, 23b of the shaft 23.

The front wheels 5a, 5b are equipped with a means for adjusting the height of the frame 1 and of the soil-working members 4, which is formed as follows in this embodiment: the axle 14 and bracket 15 rest on an upper branch 24b (FIGS. 5 and 6) of a compass link 24 of which the yoke 24a forms the lower branch, these two branches being articulated at an axle 67. Located between two flanges of the upper branch 24b is a screw 68, the lower end of which is screwed into a crosspiece 70 of the yoke 24a and to the head of which an operating handwheel 69 is fastened.

It will be appreciated that the rotation of the screw 68 in one direction or the other opens the two branches 24a and 24b of the compass link 24 to a greater or lesser extent and consequently adjusts the height of the frame 1 and of the disks 4 in relation to the soil.

Figure 5:
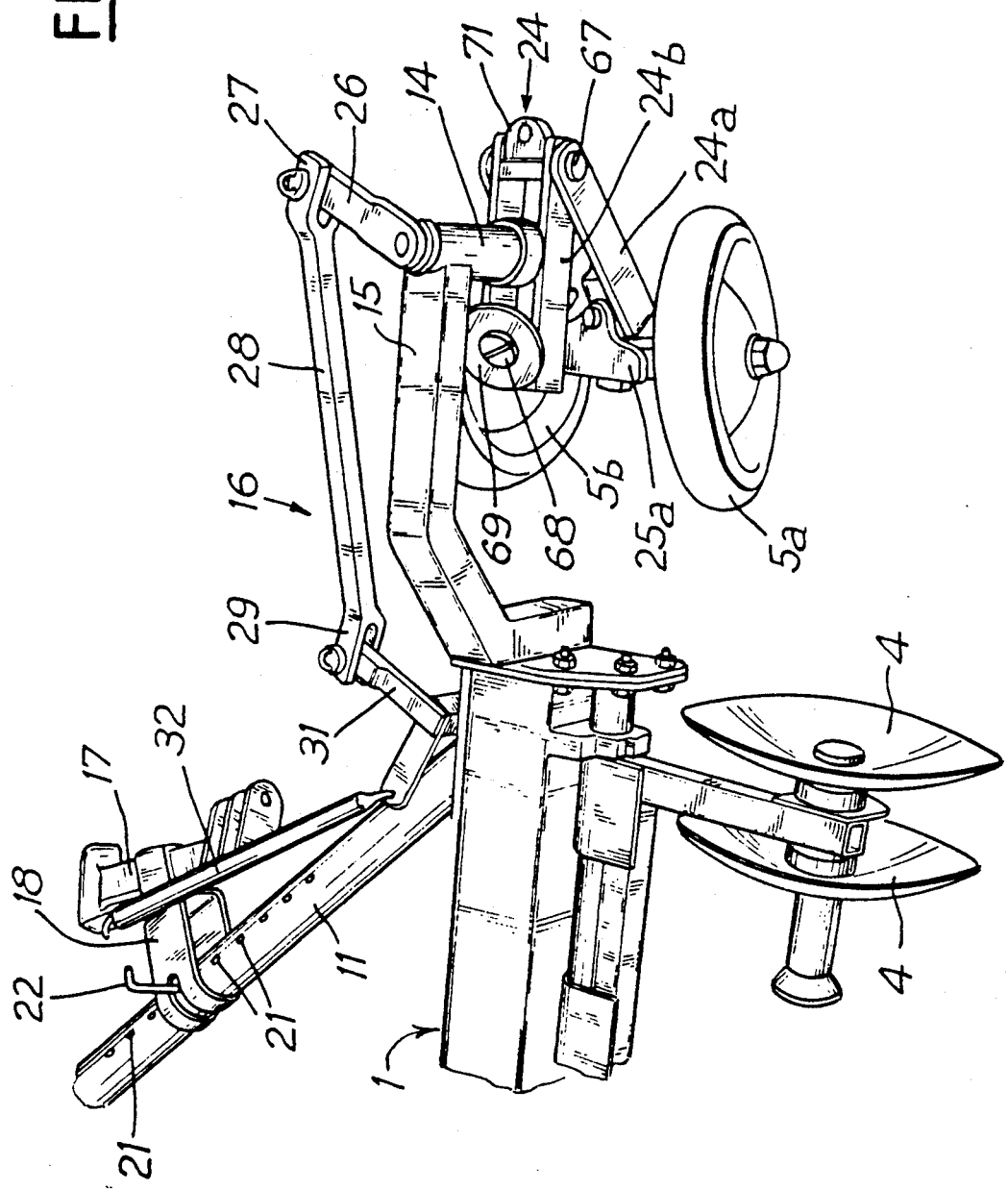
FIG. 5 is a perspective view of front wheels of a guide device of the machine and of their control system.
Figure 6:
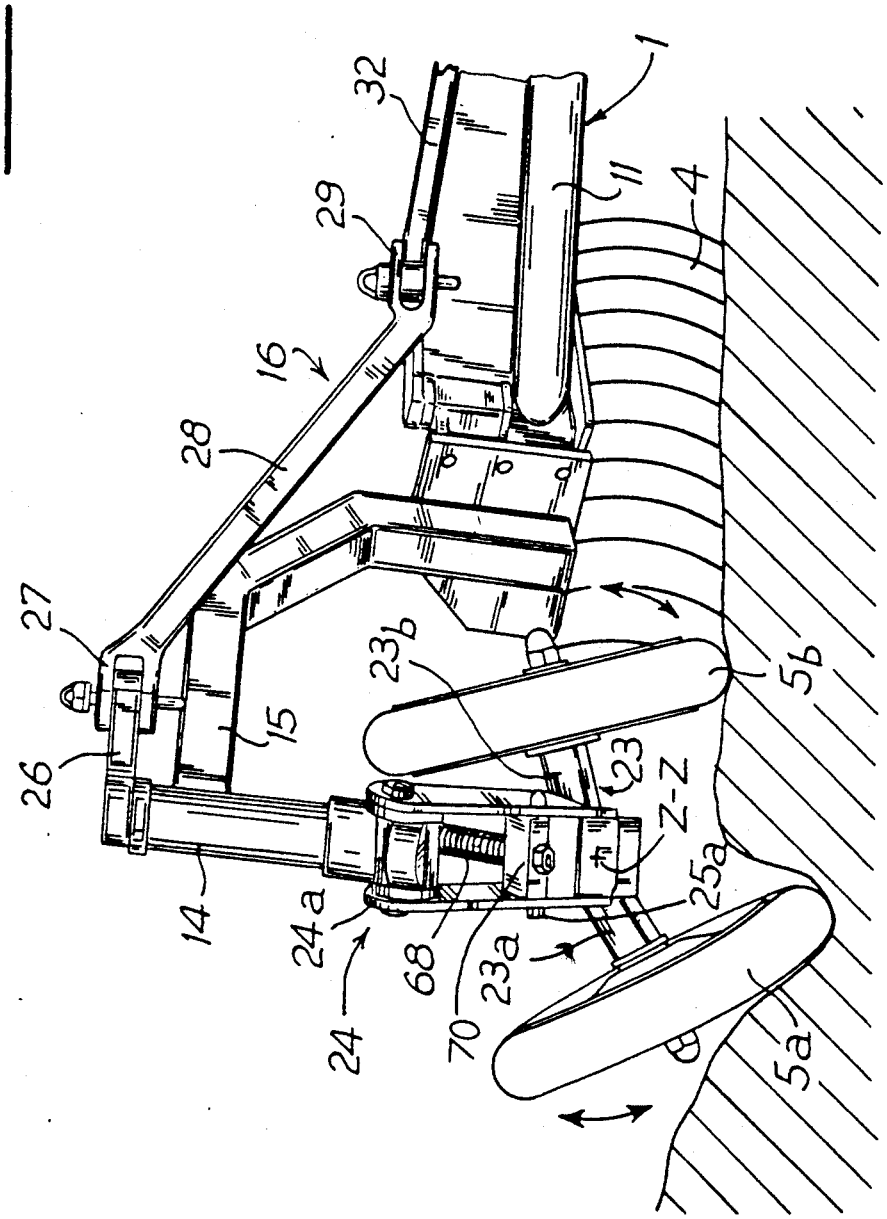
FIG. 6 is an elevation view of the twin front wheels in their working position and of their control system.

The free articulation of the front carrying wheels 5a, 5b about the axis ZZ allows them to change automatically from a working position, in which they are engaged in the last furrow dug by the preceding pass of the machine, to a raised road-travel position as will be apparent from a comparison of FIGS. 5 and 6. Moreover, the toe-in and toe-out of the wheels 5a, 5b allows the wheel 5a to bear on the inclined flask of the last furrow dug in the soil by the machine, so as to oppose the thrust exerted on the machine by the work of the disks 4 laterally relative to its direction of advance F.

In the example described, the linkage 16 making the control connection between the coupling bar 17 and the supporting axle 14 of the wheels 5a, 5b is obtained in the following way: the upper end of the axis 14 carries a horizontal arm 26, on which there can pivot an end yoke 27 of a connecting rod 28, a end yoke 29 of which is articulated pivotally on one of the branches of an angle piece 31, itself mounted pivotally on the front end of a frame 1. Articulated pivotally on the second branch of the angle piece 31 is a second connecting rod 32, of which the end opposite the angle piece 31 is articulated on a stirrup 33 fastened to the coupling bar 17.

In the transport position, the machine is drawn by the connecting rod 28 which has been uncoupled from the arm 26 and the angle piece 31 and coupled directly to the tractor by means of one of its yokes, the other yoke being coupled to a shackle 71 (FIG. 5) of the compass link 24 by means of a cotter. The orientation of the twin wheels 5a, 5b about the axle 14 and consequently the machine itself are thus controlled directly.

In this transport position, the level of the twin wheels is adjusted to provide the greatest possible ground clearance of the frame 1.

When the bar 17 coupled to the tractor tilts about the arm 11, only the connecting rod 32 is driven as a result of this tilting, its end opposite the stirrup 33 being articulated freely on the angle piece 31 which is not driven. In contrast, a pivoting of the coupling bar 17 about a vertical axis on its support piece 18 causes a corresponding pivoting of the twin wheels 5a, 5b by way of the connecting rod 32, the angle piece 31, the connecting rod 28, the arm 26 and the axle 14. The front wheels 5a, 5b therefore assume an angular orientation corresponding to the direction of movement of the tractor in the soil-working position (arrow F).

There will now be described the control system of the rear carrying wheels 6a, 6b and furrow wheels 7, 8, which comprises means for the simultaneous control of the movement of these four wheels from their road-travel position, in which they are approximately parallel to the beam 1, into their working position which can be seen in FIG. 1 and in which they are oriented at approximately 45° relative to the beam 1.

This control system comprises (FIGS. 1 to 4) a rigid support 34 mounted pivotally on the rear end of the frame 1, and a first rocker 35 articulated on the rear end of the support 34 in a bearing 36 about a substantially horizontal axis XX. The rocker 35 extends on either side of this articulation bearing 36, at the same time forming two branches 35a and 35b.

The control system for the rear wheels possesses, furthermore, a second rocker 37 articulated on one of the ends of the first rocker 35, namely on the end of its branch 35b, about a substantially horizontal axis YY parallel to the abovementioned axis XX. For this purpose, a journal 38 is fastened to the rocker 37 perpendicularly relative to the latter and passes through an end bearing 39 of the branch 35b.

Figure 3:
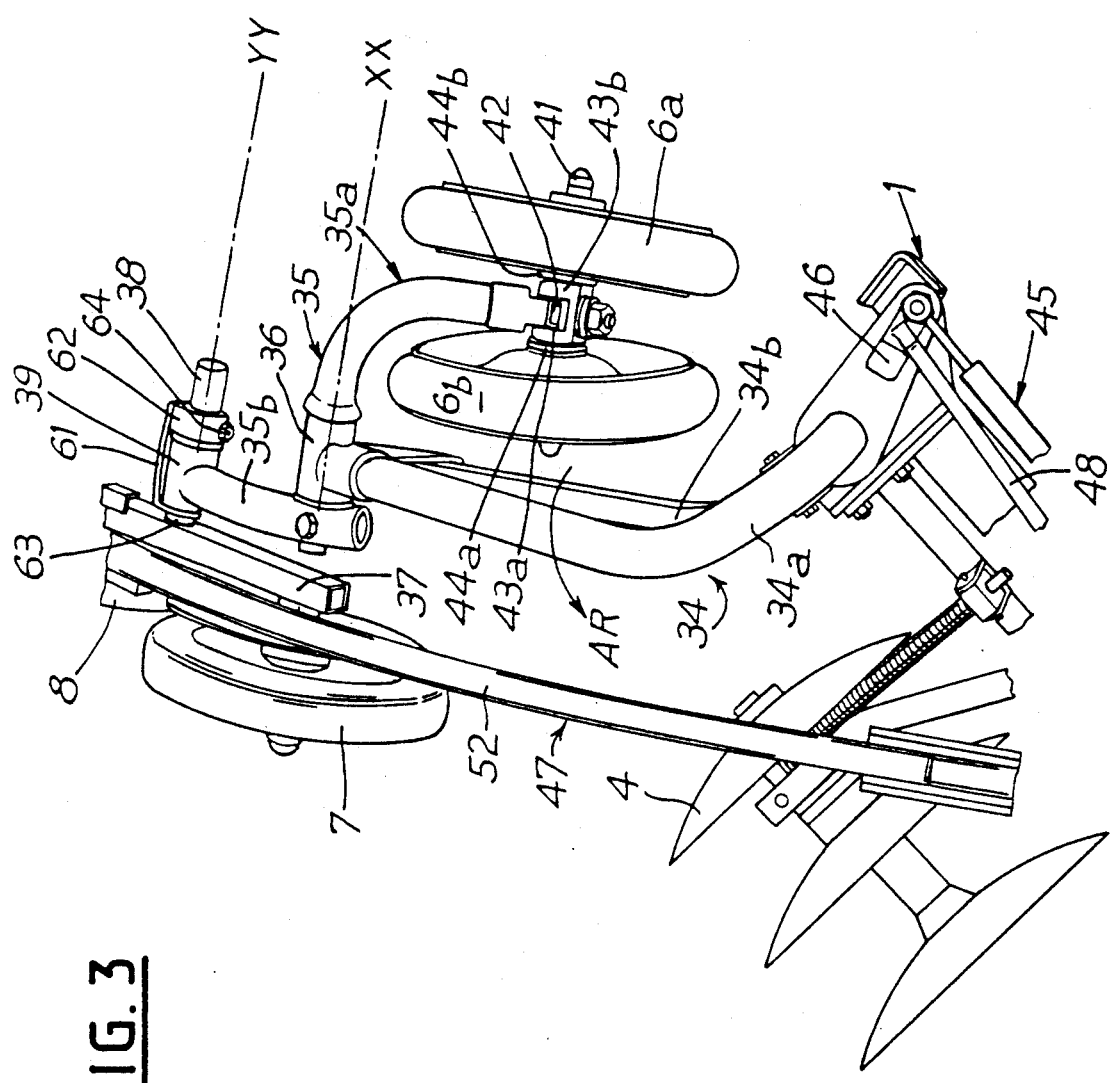
FIG. 3 is a top view of rear carrying wheels and furrow wheels and of their control system.
Figure 4:
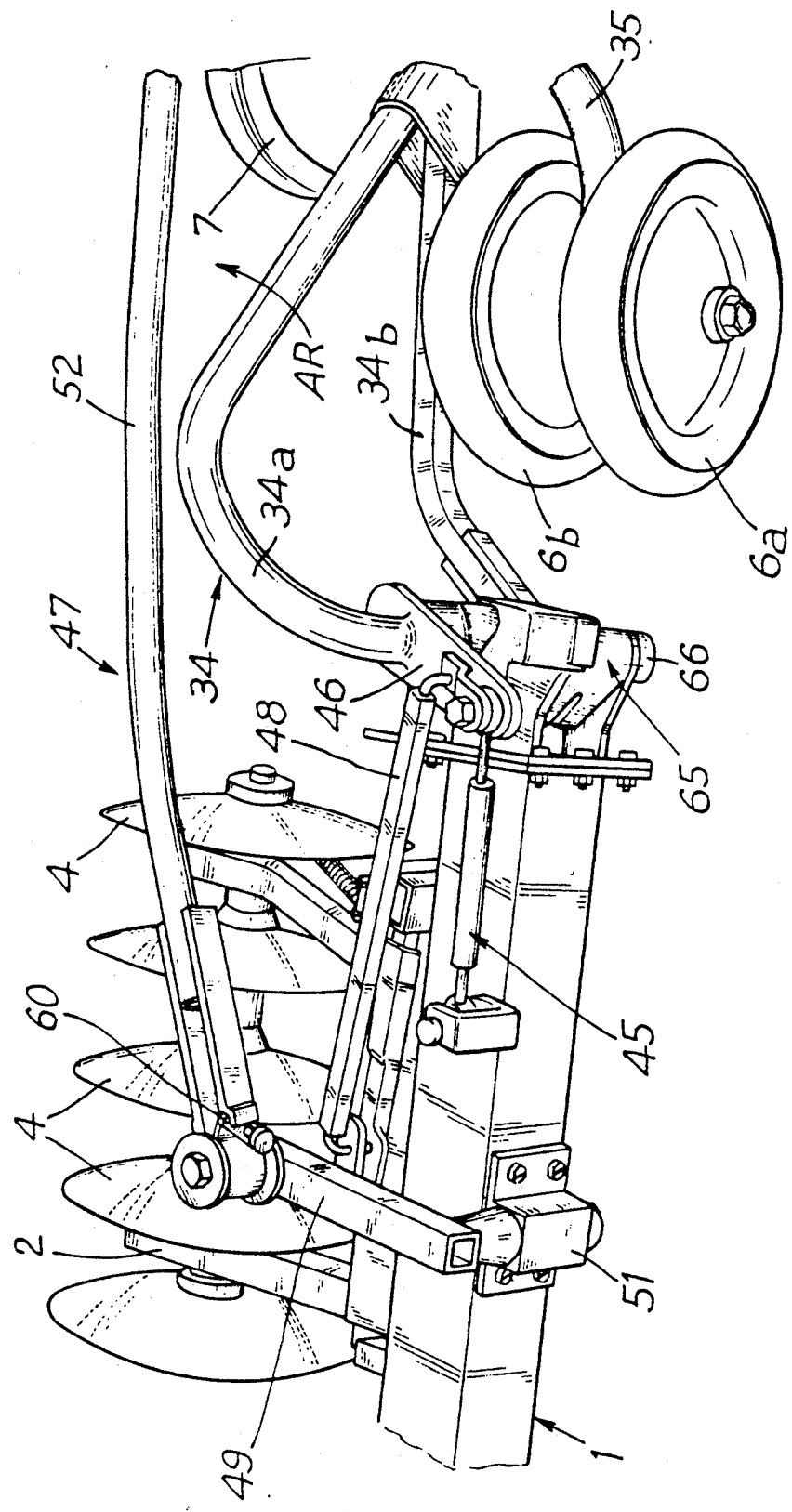
FIG. 4 is a perspective view of the control system for the rear carrying wheels and the furrow wheels of the machine.

The pair of twin wheels 6a, 6b is mounted on the end of the branch 35a of the rocker 35 opposite that branch 35b carrying the second rocker 37. In a similar way to the wheels 5a and 5b, the rear carrying wheels 6a and 6b are mounted on a non-straight shaft 41 consisting of two parts forming broken-line stubs delimiting between them an angle suitable for giving the wheels 6a, 6b appropriate toe-in and toe-out angles (FIG. 3). The shaft 41 is mounted in a freely oscillating manner in a bearing 42 on the rocker 35, the end part of the branch 35a of the latter being equipped with two stops 43a and 43b for limiting the angular deflection of the shaft 41 and of the wheels 6a and 6b. For this purpose, each stub of the shaft 41 is equipped with a cheek 44a, 44b which can come in contact with the corresponding stop 43a, 43b in order to limit the angle of oscillation of the wheels 6a and 6b.

The second rocker 37 consists essentially of a straight girder, at the ends of which the furrow wheels 7 and 8 are mounted one behind the other. The furrow wheel 7 is equipped with a pneumatic tire and is flanked internally by a coaxial metal furrow disk 7a. The wheel 7 and the disk 7a are mounted at the front end of the rocker 37, while the furrow wheel 8 consisting of a metal disk suitably toed out and toed in relative to the wheel 7 is mounted on the rear end of the rocker 37. It is expedient to point out that the lever arm between the axis of articulation YY of the rocker 37 and the axis of the wheel 7 is substantially greater than the lever arm between the axis of articulation YY and the axis of the furrow wheel 8 for reasons which will be explained later.

The means for the simultaneous control of the movement of the rear carrying wheels 6a, 6b and of the furrow wheels 7, 8 comprise:

a preferably hydraulic jack 45 articulated on the one hand on the rear part of the frame 1 and on the other hand on the rigid support 34, so as to be capable of controlling the pivoting of the latter and of the assembly formed by the rockers 35 and 37, the twin carrying wheels 6a, 6b and furrow wheels 7, 8; for this purpose, the rod of the jack 45 is articulated on a lateral arm 46 of the support 34;

and an articulated control connection system 47 between the rigid support 34 and the part of the rocker 37 carrying the rear furrow wheel 8. The connection system 47 comprises a connecting rod 48 articulated on the support 34, more specifically on its arm 46 in the vicinity of the articulation of the jack 45; on the other hand the connecting rod 48 is articulated pivotally at its opposite end on a bracket 49 mounted pivotally on the frame 1 about a vertical axis seated in a gusset 51 fastened to the frame 1. Furthermore, the system 47 possesses a rod 52 articulated pivotally at one of its ends on the bracket 49. This rod 52 extends as far as the furrow wheel 8, and its opposite end consists of a yoke 53 articulated about a substantially horizontal axle 54 connecting two flanges 55 fastened by any suitable means to the rear part of the rocker 37 which carries the furrow wheel 8.

Figure 2:
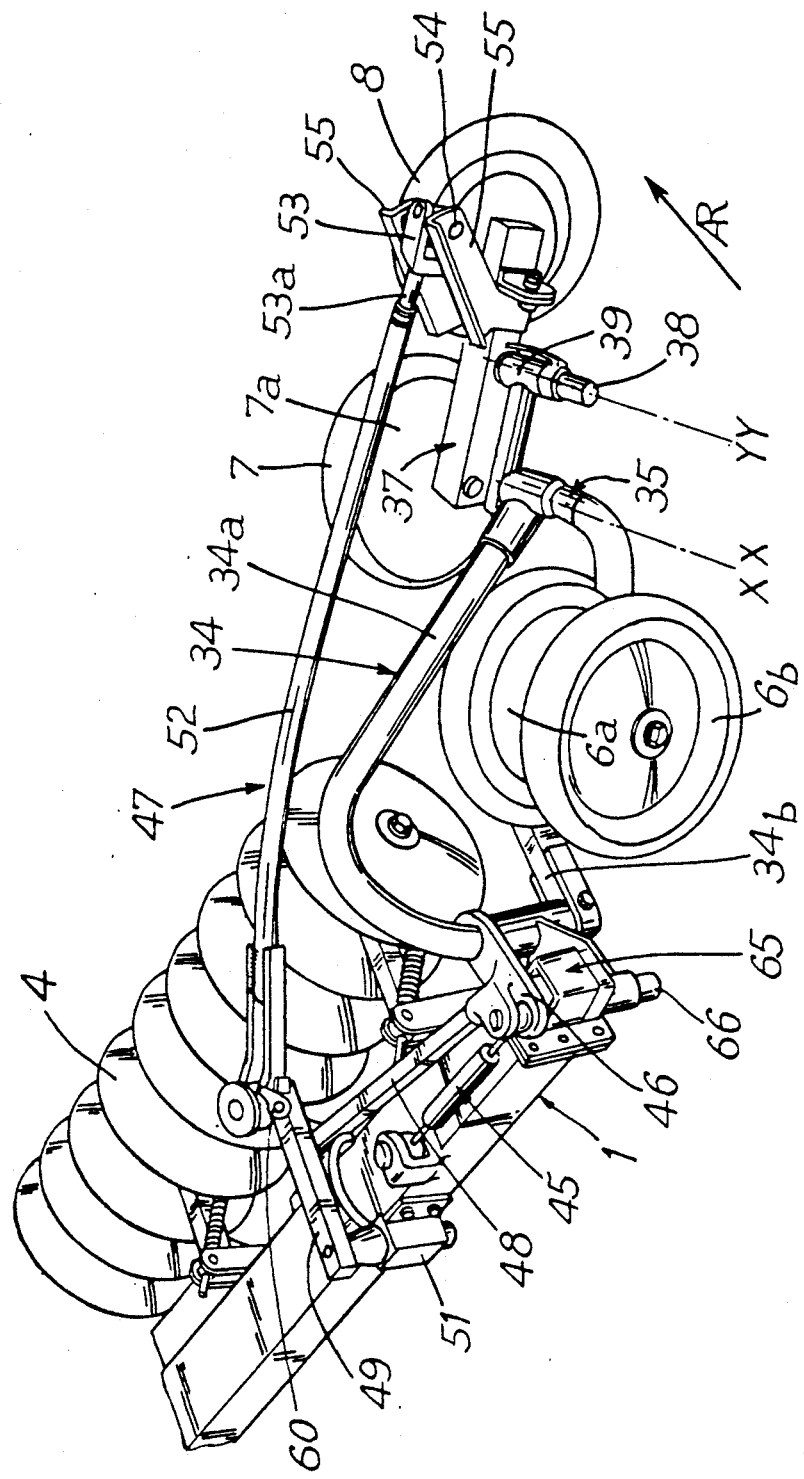
FIG. 2 is a perspective view, on a scale enlarged in relation to FIG. 1, of rear wheels of the machine and of their control system, these wheels being in their working position.

The transmission 47 is equipped with means for locking the rod 52 against any movement in the road-travel position of the machine. In the example described, these means comprise a pin 60 passing through the end of the rod 52 near its articulation on the bracket 49 and eliminating any longitudinal play of the rod 52 on this articulation (FIG. 2). In complementary fashion, the locking means posses (FIG. 3) a bow 61 connecting two rings 62 and 63 which are located on either side of the articulation 39 and through which passes the axle 38 fixed to the rocker 37. The axial position of this piece (61, 62, 63) is adjustable by means of a peg 64 passing through the ring 62 and one of a plurality of radial holes in the axle 38.

In the road-travel position and when the rear furrow wheel 8 rises, the pin 60 prevents the rod 52 from sliding on its pivot articulating it on the bracket 49, thereby preventing any unbalancing of the machine. At the same time, an edge of the bow 61 bears on the articulation 39 of the arm 35b. The rod 52 is thus locked against any movement by the bow 61 and the pin 60.

It is also expedient to note that the yoke 53 is equipped with a threaded stem 53a (FIG. 2) screwed into the adjacent end of the rod 52. This yoke 53 allows the free deflection of the rocker 37 in relation to the axis YY under all circumstances. The degree of penetration of the threaded stem 53a changes the length of the rod 52, in such a way that the free oscillation of the rocker 37 is maintained in all positions during work.

It would be seen that, in the example described, the support 34 consists of two rigid tubular pieces 34a and 34b, the upper piece 34a forming an elbow between its pivot articulating it to the frame 1 and its end articulated to the first rocker 35. The second tubular part 34b extends from the lower end of the pivot axle of the piece 34a as far as the articulation bearing 36 with the rocker 35. The support assembly 34 so produced is sufficiently rigid to allow it to support the weight of the machine and the sets of carrying wheels 6a, 6b and furrow wheels 7, 8.

The support 34 is articulated on the rear end of the frame 1 by means of hinges 65 (FIGS. 2 and 4), returned by springs, about a pivot 66 arranged in the extension of the jack 45.

This safety system allows the machine to execute turns at the ends of a field, without causing the fracture of the rear wheel set which, in fact, can pivot relative to the frame 1 and then resume its initial position against the latter after the turn.

The functioning of the guide device just described and of the machine equipped with this device is as follows.

In the road-travel position of the machine, the coupling bar 17 is in such a position that the front wheels 5a, 5b and rear wheels 6a, 6b, 7, 8 are orientated approximately in the longitudinal direction of the frame 1, as is the central wheel 9. To cause the wheel sets to change from this position to their working position in a field for the purpose of ploughing up its stubble by means of the disks 4, the tractor is positioned in the direction of traction represented by the arrow F, thereby correlatively causing the front wheels 5a, 5b and the freely pivoting wheel 9 to pivot into their positions shown in FIG. 1. At the same time, the jack 45 is actuated in the direction causing the support 34 to pivot in the counter-clockwise direction of the arrow AR (FIGS. 2, 3 and 4), in such a way that this pivoting brings the twin wheels 6a, 6b and the wheels 7, 8 into their angular working position by an inclination of approximately 45° relative to the planes of the disks 4. At the same time as the support 34 and the associated wheels pivot relative to frame 1, the articulated system 47 actuated as a result of the rotation of the arm 46 causes the rear furrow wheel 8 to tilt into its lower working position (FIG. 2), in which it is positioned so as to bear on the bottom of the furrow dug by the last disk 4, while the pneumatic wheel 7 likewise remains bearing in this furrow.

Because the lever arm of the axle of the front wheel 7 on the rocker 37 is longer than the lever arm of the rear wheel 8, this ratio of the lever arms being fixed appropriately, it becomes possible for the front furrow wheel 7 to exert constant pressure on the rear wheel 8. In the example described, the rear wheel 8 consists of a plane metal disk of large thickness which can be weighted with masses of cast iron. The shaft of the disk 8 is cambered so as to give the disk a permanent inclination relative to a vertical plane, this inclination being adjustable or not. The position of the shaft of the disk 8 is such that the plane of the latter is not parallel to the vertical plane of advance of the machine, but forms with this an angle more open at the front than at the rear. This arrangement allows the disk 8 to roll in the bottom of the furrow, at the same time "biting" laterally and constantly in a direction opposite to the direction of thrust exerted by the ploughing disks 4 and so as to counteract this thrust.

Like the disk 8, the front furrow wheel 7 is inclined in the vertical plane according to the bisector of the angle formed by the vertical wall and the bottom of the furrow. This inclination is obtained by the position of the supporting shaft of the front wheel 7 at an acute angle, if appropriate adjustable.

The wheel 7 can advantageously be lined with the metal disk 7a, the outside diameter of which is slightly smaller than the outside diameter under load of the pneumatic tire of the wheel 7. This arrangement increases the hold and therefore the grip of the wheel 8 in the bottom of the furrow, the disk 8 having a more positive and more effective direct soil-penetrating action than the soft moving flank of the pneumatic tire of the wheel 7.

During the advance of the machine in the working position, the two groups of front and rear guide wheels roll in parallel on either side of the frame 1, a considerable proportion of the total weight of the machine resting on the bearing 36. On the other hand, the lever arm of the wheel 7 in relation to this articulation bearing 36 is smaller than the lever arm between this bearing 36 and the articulation bearing 42 of the shaft 41 of the twin wheels 6a, 6b. The weight is thereby distributed unequally between the wheel 7 and the twin wheels, the pressure exerted on the wheel 7 being higher than that exerted on the twin wheels. Furthermore, the rotation of the rocker 37 in the bearing 39 increases the penetration and therefore anchorage of the furrow wheels 7 and 8 in the soil.

In summary, in the event that all the wheels are in contact with the soil, the maximum pressure exerted on the bearing 36 is distributed increasingly from the front bearing 42 to the shaft of the wheel 7 via the bearing 39 and the shaft of the wheel 8.

The two sets of front wheels 5a, 5b and rear wheels 6a, 6b are angularly positioned automatically, respectively in the last furrow dug by the preceding pass of the machine, with the wheel 5a bearing on the flank of the furrow against the thrust exerted by the machine on this side. The rear wheels 6a, 6b bear on the surface of the unploughed soil, likewise positioning themselves automatically as a result of their freely oscillating mounting, in the same way as the wheels 5a, 5b. Moreover, the wheel 7, flanked by its disk 7a, and the wheel 8 bear on the flank of the last furrow dug, in order on this side to withstand the lateral thrust of the machine and thus ensure its guidance.

Of course, the change from the working position to the road-travel position takes place by means of maneuvers opposite to those mentioned above.

The advantages of the device according to the invention are as follows.

First of all, the capacity for simultaneously controlling the change of the rear guide wheels 6a, 6b and of the furrow wheels 7, 8 from their road-travel position to their working position, and vice versa, by means of the abovedescribed maneuvering device (45, 34, 47, etc.) avoids the lengthy, difficult and arduous manual operations which have been necessary hitherto. In fact, it is thus sufficient to control the actuation of the jack 45.

The replacement of a single guide wheel at the front and at the rear by freely oscillating twin wheels allows these to position themselves automatically in the road-travel or journey position of the machine, thus also eliminating the handling operations necessary hitherto.

The multiplicity of the bearing points provided by the twin wheels 5a, 5b, 6a, 6b and by the central wheel 9 makes the sudden complete loss of grid with the soil impossible. In fact, during rapid movement of the machine on land as uneven or varied as possible, the weight resting on the rear part of the machine is distributed either to all four wheels 6a, 6b, 7, 8 or to three, two or even, in extreme cases, only one of these wheels in the event of a momentary loss of grip of one, two or three wheels. With the conventional single guide wheel, the machine was no longer retained in the event of a loss of grip because it was crossing a movable obstacle (wood, stones, clods of earth), so that this disappearance of guidance caused the machine to drift in the direction of the thrust of the disks.

The replacement of the single guide wheel by two twin front wheels 5a, 5b and their freely oscillating mounting on a broken-line shaft also allow the wheels to follow the contours of the land perfectly by rising or falling. If one of the wheels 5a and 5b crosses a movable obstacle and loses its grip, it instantaneously increases the grip of the other of the twin wheels as a result of the transfer of weight, thereby preventing any loss of contact. The same process applies in a longitudinal plane to the group of furrow wheels 7, 8. Here, the transfer of weight takes place from front to rear, or vice versa. This prevents any lateral slip of the machine as a result of a momentary localized loss of grip, because of the multiplicity according to the invention of front and rear guide wheels highly mobile in all planes, thus allowing them to follow all the contours of the soil perfectly but at the same time thereby guaranteeing permanent grip without the risk of the loss of contact.

Another appreciable advantage of the invention is the direct coupling of the machine to the tractor by means of the arm 11 and the bar 17, without a drawbar, thus making it possible to provide a compact machine with a short steering-lock radius. The result of this is that the machine designed in this way can be used on small or medium areas, such as are found in European countries, without any loss of cultivated area at the locations of turns in the fields.

The guide and control device according to the invention can be used especially on large-size machines working the soil with blades, shares or disks, such as the disks 4 of the stubble-plough illustrated in the drawings on widths of frame 1 larger than, for example, 2.50 meters and with a depth of, for example, more than 15 centimeters in the soil on compact land.

The invention is not limited to the example described and can have many alternative embodiments. Thus, it is clear that the system for the simultaneous control of the rotation of the rear wheels 6a, 6b, 7, 8 and of the tilting of the furrow wheel 8, as described, can be replaced by any equivalent system. The shaft of the twin front wheels can be straight, in which case the front wheels do not have any toe-out (inclination relative to a vertical plane) or toe-in (wheels closer to one another at the front than at the rear).

What is claimed is:

1. In a guide and control device for use on an agricultural machine that is subjected during operation to lateral thrust relative to a direction of traction and that includes a frame equipped with soil-working members, front carrying wheels, rear carrying wheels and at least one furrow wheel, said guide and control device including systems for changing the wheels of the machine between respective road-travel positions thereof and respective working positions thereof, the improvement wherein said system for the rear carrying wheels and for the at least one furrow wheel comprises:

means, to be operatively connected to the rear carrying wheels and to the at least one furrow wheel, for pivotally moving the rear carrying wheels about an approximately vertical axis between the road-travel and working positions thereof and for simultaneously controlling the movement of the furrow wheel to tilt between a raised road-travel position thereof and a lowered working position thereof.

2. The improvement claimed in claim 1, wherein the front carrying wheels of the machine comprise a pair of twin front wheels.

3. The improvement claimed in claim 2, wherein said system for the twin front wheels comprises means for mounting the twin front wheels for free oscillation about a horizontal axis, such that the twin front wheels are capable of changing automatically from the working position thereof to the road-travel position thereof.

4. The improvement claimed in claim 3, wherein said mounting means comprises a shaft formed by a pair of portions extending at an angle to each other for supporting respective of the twin front wheels with relative toe-in and toe-out, and stops for said shaft portions for limiting the angle of deflection of the twin front wheels relative to said axis of oscillation.

5. The improvement claimed in claim 2, wherein said system for the twin front wheels comprises a bar for coupling the machine to a tractor, said coupling bar being pivotable about a vertical axis, and control linkage for connecting said coupling bar to the twin front wheels such that pivoting of said coupling bar about said vertical axis will change the twin front wheels between the road-travel and working positions thereof.

6. The improvement claimed in claim 5, wherein said control linkage comprises an arm having a first end to be connected to a front portion of the frame with said arm inclined relative thereto, and a spar connected to a second end of said arm and to be connected to the frame, said spar to support a side carrying wheel, and said arm and said spar forming a triangular structure with the frame.

7. The improvement claimed in claim 2, wherein said system for the twin front wheels comprises means for adjusting the height of the frame and the soil-working members relative to the twin front wheels, said adjusting means comprising a compass linkage including a lower branch carrying a shaft for supporting the twin front wheels and an upper branch pivotable relative to said lower branch by means of an adjustment screw, a pivot axle supported by said upper branch, and a bracket supporting said pivot axle and to be connected to the frame.

8. The improvement claimed in claim 1, wherein the rear carrying wheels of the machine comprise a pair of twin rear wheels.

9. The improvement claimed in claim 8, wherein said control means for rear carrying wheels comprises a rigid support pivotally mountable at a first end thereof to a rear end of the frame, a first rocker member articulated about an articulation bearing to a second end of said rigid support for articulation about a substantially horizontal first axis, said first rocker member having first and second portions extending from opposite sides of said articulation bearing, the twin rear wheels to be supported by said first portion of said first rocker member, and a second rocker member articulated to said second portion of said first rocker member for articulation about a substantially horizontal second axis parallel to said first axis, said second rocker member having first and second ends to support respective front and rear furrow wheels.

10. The improvement claimed in claim 9, further comprising a shaft mounted on said first portion of said first rocker member and formed by a pair of shaft portions extending at an angle to each other for supporting respective of the twin rear wheels with relative toe-in and toe-out, and stops for said shaft for limiting the angle of deflection of the twin rear wheels relative to said first axis.

11. The improvement claimed in claim 9, wherein a lever arm between said first end of said second rocker member and said second axis is greater than a lever arm between said second end of said second rocker member and said second axis.

12. The improvement claimed in claim 9, wherein the front furrow wheel is to include a coaxial furrow disk.

13. The improvement claimed in claim 9, wherein said control means for the rear carrying wheels further includes a jack articulated to said rigid support and to be articulated to the rear end of the frame for controlling pivoting of said rigid support relative to the frame and thereby for controlling the pivoting of said first and second rocker members and the twin rear wheels and the front and rear furrow wheels relative to the frame, and transmission means articulated between said rigid support and said second end of said second rocker member such that as said rigid support pivots in a direction to move the twin rear wheels to the working position thereof said second rocker member simultaneously pivots about said second axis to tilt said second end of said second rocker member and thereby the rear furrow wheel downwardly to the lowered working position thereof, and such that as said rigid support pivots in a direction to move the twin rear wheels to the road-travel position thereof said second rocker member simultaneously pivots about said second axis to tilt said second end of said second rocker member and thereby the rear furrow wheel upwardly to the raised road-travel position thereof.

14. The improvement claimed in claim 13, wherein said transmission means comprises a connecting rod articulated to said rigid support and articulated to a bracket to be pivoted to the frame, and a rod having a first end pivoted to said bracket and a second end connected for pivotal movement about a horizontal axis to said second end of said second rocker member.

15. The improvement claimed in claim 14, further comprising means for preventing relative pivotal movement of said first and second ends of said rod in the road-travel positions of the wheels.

16. The improvement claimed in claim 15, wherein said preventing means comprises a pin passing through said first end of said rod, and a member connecting said first and second rocker members and preventing articulation of said second rocker member about said second axis.

17. In an agricultural machine that is subjected during operation to lateral thrust relative to a direction of traction and that includes a frame equipped with soil-working members, front carrying wheels, rear carrying wheels and at least one furrow wheel, and a guide and control device including systems for changing said wheels of said machine between respective road-travel positions thereof and respective working positions thereof, the improvement wherein said system for said rear carrying wheels and for said at least one furrow wheels comprises:
means, operatively connected to said rear carrying wheels and to said at least one furrow wheel, for pivotally moving said rear carrying wheels about an approximately vertical axis between said road-travel and working positions thereof and for simultaneously controlling the movement of said furrow wheel to tilt between a raised road-travel position thereof and a lowered working position thereof.

18. The improvement claimed i claim 17, wherein said front carrying wheels of said machine comprise a pair of twin front wheels.

19. The improvement claimed in claim 18, wherein said system for said twin front wheels comprises means for mounting said twin front wheels for free oscillation about a horizontal axis, such that said twin front wheels are capable of changing automatically from said working position thereof to said road-travel position thereof.

20. The improvement claimed in claim 19, wherein said mounting means comprises a shaft formed by a pair of portions extending at an angle to each other and supporting respective of said twin front wheels with relative toe-in and toe-out, and stops for said shaft portions for limiting the angle of deflection of said twin front wheels relative to said axis of oscillation.

21. The improvement claimed in claim 18, wherein said system for said twin front wheels comprises a bar for coupling said machine to a tractor, said coupling bar being pivotable about a vertical axis, and control linkage connecting said coupling bar to said twin front wheels such that pivoting of said coupling bar about said vertical axis changes said twin front wheels between said road-travel and working positions thereof.

22. The improvement claimed in claim 21, wherein said control linkage comprises an arm having a first end connected to a front portion of said frame with said arm inclined relative thereof, and a spar connected to a second end of said arm and connected to said frame, said spar supporting a side carrying wheel, and said arm and said spar forming a triangular structure with said frame.

23. The improvement claimed in claim 18, wherein said system for said twin front wheels comprises means for adjusting the height of said frame and the soil-working members relative to said twin front wheels, said adjusting means comprising a compass linkage including a lower branch carrying a shaft supporting said twin front wheels and an upper branch pivotable relative to said lower branch by means of an adjustment screw, a pivot axle supported by said upper branch, and a bracket supporting said pivot axle and connected to said frame.

24. The improvement claimed in claim 17, wherein said rear carrying wheels of said machine comprise a pair of twin rear wheels.

25. The improvement claimed in claim 24, wherein said control means for said rear carrying wheels comprises a rigid support pivotally mounted at a first end thereof to a rear end of said frame, a first rocker member articulated about an articulation bearing to a second end of said rigid support for articulation about a substantially horizontal first axis, said first rocker member having first and second portions extending from opposite sides of said articulation bearing, said twin rear wheels being supported by said first portion of said first rocker member, and a second rocker member articulated to said second portion of said first rocker member for articulation about a substantially horizontal second axis parallel to said first axis, said second rocker member having first and second ends supporting respective front and rear furrow wheels.

26. The improvement claimed in claim 25, further comprising a shaft mounted on said first portion of said first rocker member and formed by a pair of shaft portions extending at an angle to each other and supporting respective of said twin rear wheels with relative toe-in and toe-out, and stops for said shaft for limiting the angle of deflection of said twin rear wheels relative to said first axis.

27. The improvement claimed in claim 25, wherein a lever arm between said first end of said second rocker member and said second axis is greater than a lever arm between said second end of said second rocker member and said second axis.

28. The improvement claimed in claim 25, wherein said front furrow wheel includes a coaxial furrow disk.

29. The improvement claimed in claim 25, wherein said control means for said rear carrying wheels further includes a jack articulated to said rigid support and articulated to said rear end of said frame for controlling pivoting of said rigid support relative to said frame and thereby for controlling the pivoting of said first and second rocker members and said twin rear wheels and said front and rear furrow wheels relative to said frame, and transmission means articulated between said rigid support and said second end of said second rocker member such that as said rigid support pivots in a direction to move said twin rear wheels to said working position thereof said second rocker member simultaneously pivots about said second axis to tilt said second end of said second rocker member and thereby said rear furrow wheel downwardly to said lowered working position thereof, and such that as said rigid support pivots in a direction to move said twin rear wheels to said road-travel position thereof said second rocker member simultaneously pivots about said second axis to tilt said second end of said second rocker member and thereby said rear furrow wheel upwardly to said raised road-travel position thereof.

30. The improvement claimed in claim 29, wherein said transmission means comprises a connecting rod articulated to said rigid support and articulated to a bracket pivoted to said frame, and a rod having a first end pivoted to said bracket and a second end connected for pivotal movement about a horizontal axis to said second end of said second rocker member.

31. The improvement claimed in claim 30, further comprising means for preventing relative pivotal movement of said first and second ends of said rod in said road-travel positions of said wheels.

32. The improvement claimed in claim 31, wherein said preventing means comprises a pin passing through said first end of said rod, and a member connecting said first and second rocker members and preventing articulation of said second rocker member about said second axis.

* * * * *